(12) United States Patent
B et al.

(10) Patent No.: US 11,442,692 B1
(45) Date of Patent: Sep. 13, 2022

(54) ACOUSTIC WORKFLOW SYSTEM DISTRIBUTION

(71) Applicant: International Business Machines Corporation, Armonk, NY (US)

(72) Inventors: Dinesh Kumar B, Bangalore (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 56 days.

(21) Appl. No.: 17/202,642

(22) Filed: Mar. 16, 2021

(51) Int. Cl.
*G06F 3/16* (2006.01)
*H04N 1/00* (2006.01)

(52) U.S. Cl.
CPC .............. *G06F 3/167* (2013.01); *G06F 3/165* (2013.01); *H04N 1/00403* (2013.01)

(58) Field of Classification Search
None
See application file for complete search history.

(56) References Cited

U.S. PATENT DOCUMENTS

| 10,001,759 | B2 | 6/2018 | Gupta | |
|---|---|---|---|---|
| 2002/0065071 | A1* | 5/2002 | Hunzinger | H04W 76/19 455/452.2 |
| 2003/0040956 | A1* | 2/2003 | Gaston | G07C 13/00 705/12 |
| 2010/0208146 | A1* | 8/2010 | Reams | G08C 17/02 340/539.32 |
| 2016/0182704 | A1* | 6/2016 | Min | H04Q 9/00 455/420 |
| 2018/0248748 | A1* | 8/2018 | Bar-Joshua | H04L 41/12 |
| 2018/0255199 | A1* | 9/2018 | Watanabe | H04N 1/32 |
| 2020/0175976 | A1 | 6/2020 | Rakshit et al. | |

FOREIGN PATENT DOCUMENTS

EP   3314820 A1   1/2017

OTHER PUBLICATIONS

Kantra, S., "How to Fix Bluetooth Pairing Problems", 4 pages, Oct. 29, 2020, found at: https://www.techlicious.com/how-to/how-to-fix-bluetooth-pairing-problems/.
"Windows 10—Bluetooth mouse suddenly disconnects or stops working", 15 pages, downloaded on Mar. 9, 2021 at: https://winaero.com/blog/windows-10-bluetooth-mouse-suddenly-disconnects-or-stops-working/.

(Continued)

*Primary Examiner* — Lennin R Rodriguezgonzalez
(74) *Attorney, Agent, or Firm* — Eric Chesley

(57) ABSTRACT

A workflow initiation is detected by a first electronic device. The workflow initiation is directed to a connected environment workflow. The connected environment workflow is related to performance of a set of one or more workflow tasks. It is determined that a first remote task of the set of workflow tasks is directed at a second electronic device. The determination is in response to the workflow initiation. A communication failure is identified. The communication failure is based on the first remote task. The communication failure is a failure to communicate with the second electronic device. An acoustic command is generated in response to the communication failure. The acoustic command is related to the first remote task. The acoustic command is provided to the second electronic device.

20 Claims, 5 Drawing Sheets

(56) References Cited

OTHER PUBLICATIONS

Midi et al., Smart-Voice Invocation of Scenes in Home-Automation Systems, 11 pages, IP.com No. IPCOM000251998D, IP.com Published Date: Dec. 13, 2017.
Authors et. al.: Disclosed Anonymously, Method for Real-Time Voice Communication, IP.com No. IPCOM000255169D, 23 pages, IP.com Electronic Publication Date: Sep. 6, 2018.
Mell, P. et al., "The NIST Definition of Cloud Computing", Recommendations of the National Institute of Standards and Technology, NIST Special Publication 800-145, 7 pages, Sep. 2011.

* cited by examiner

ACOUSTIC WORKFLOW SYSTEM DISTRIBUTION

BACKGROUND

The present disclosure relates to computer workflow task distribution, and more specifically, to processing of workflow tasks in a smart home.

Smart homes or smart offices may communicate electronic commands between computer-embedded devices within a local or personal network. The electronic commands may be instructions to perform tasks of a workflow, scene, or other orchestrated activity. The computer-embedded devices may operate based on and rely upon a stable and constant presence of a local or personal network.

SUMMARY

According to embodiments, disclosed are a method, system, and computer program product.

A workflow initiation is detected by a first electronic device. The workflow initiation is directed to a connected environment workflow. The connected environment workflow is related to performance of a set of one or more workflow tasks. It is determined that a first remote task of the set of workflow tasks is directed at a second electronic device. The determination is in response to the workflow initiation. A communication failure is identified. The communication failure is based on the first remote task. The communication failure is a failure to communicate with the second electronic device. An acoustic command is generated in response to the communication failure. The acoustic command is related to the first remote task. The acoustic command is provided to the second electronic device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
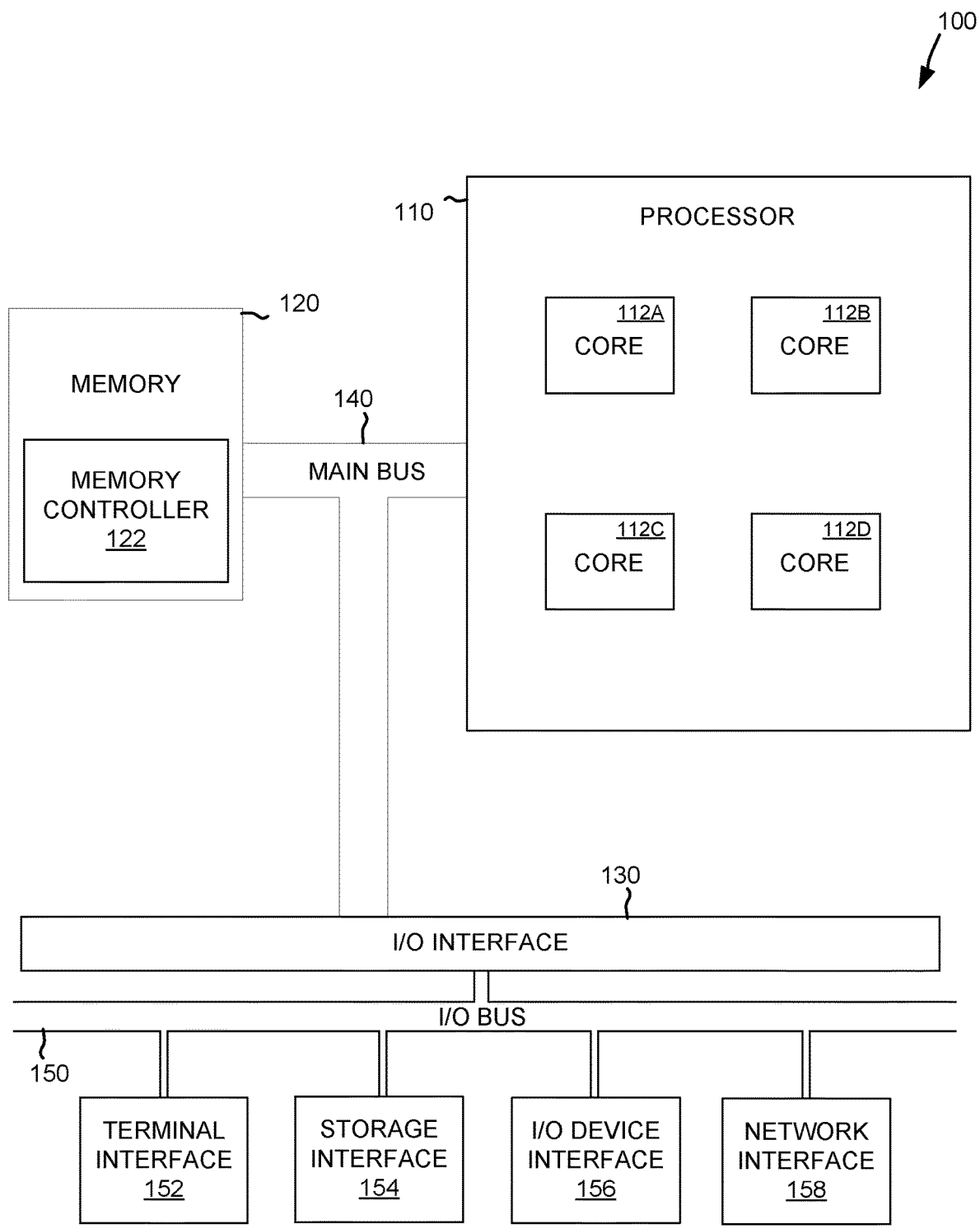
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer workflow task distribution; more particular aspects relate to processing of workflow tasks in a smart home. While the present disclosure is not necessarily limited to such applications, various aspects of the disclosure may be appreciated through a discussion of various examples using this context.

In a connected environment, such as a smart home or smart office, a plurality of devices may exist with computer-embedded technology. Computer-embedded electronic devices ("electronic devices") may be devices that contain computer systems capable of performing operations based on software. Specifically, electronic devices may contain, among other things, a processor, a memory, and an input/output system ("I/O"). Examples of electronic devices may be conventional computers, such as a laptop or desktop personal computer (alternatively, a PC), or mobile computers, such as tablets and smartphones. Other examples of electronic devices may be smart devices, such as a smart television, smart dishwasher, smart speakers, or other relevant smart appliance or household device. Another example of a connected environment is an Internet of Things ("IoT") environment.

The electronic devices in a connected environment may operate in conjunction with a local area network or personal area network. Specifically, a connected environment may include a network generated by a network router to facilitate connection between the various electronic devices. For example, a wireless network router may operate a local area network and each electronic device in the local area network may be configured with hardware such as network transceivers to communicate with the router, and consequently with other network devices. In some instances, a local area network may be a direct network connection, such as a network that connects two or more electronic devices together without an intermediary router or other middle device. For example, a laptop computer may operate as a local area network hotspot and host network connection for other electronic devices in a coffee shop. In some instances, a connected environment may operate based on a personal area network, such as a network that operates in a very short-range. For example, a personal area network may operate to communicatively couple two or more devices that are located within ten feet of each other.

A connected environment may suffer from many disadvantages related to connectivity and communication between various devices. A first disadvantage may be that a network connection may be indirectly unreliable. Specifically, a network connection may be susceptible to outages related to a router or other part of the infrastructure needing to restart or update for a bug-fix or patch. Another disadvantage may be that a network connection may be directly unreliable. Certain devices may lose power temporarily and not have a battery. For example, a smartphone may have a battery and so a loss of power may not affect its ability to run and execute software, but a smart appliance may not have an internal power source, and a temporary power outage may reset the functionality of the device. Yet another disadvantage may be that electronic devices may have convoluted setup processes. For example, a user may need to perform a multi-step setup process to pair or communicatively synchronize operation of multiple electronic devices.

Acoustic workflow system distribution (AWSD) may achieve advantages over other connected environments, such as smart homes and smart offices. AWSD may leverage various subsystems in existing electronic devices to operate without interruptions due to network issues. AWSD may facilitate a communication between electronic devices in a connected environment without an active network connection. Operation without an active network connection may include two or more devices communicating with each other without the presence of a network signal, with no active network connection, with one or more of the devices not able to communicate through a network. Operation without an active network connection may include two or more electronic devices losing a pairing between each other.

The AWSD may operate by leveraging acoustic input and response systems of electronic devices. Some electronic devices may operate through an acoustic interface and are capable of interacting with users. Specifically, voice-based assistants may be configured with a voice-based input to receive input from a user, such as a microphone. Further, and response to input from a user a voice-based output system may be configured to generate machine-based speech to communicate receipt of input from a user, such as a speaker. The AWSD may operate without communication of a network. Specifically, the AWSD may not communicate through a electrical or electromagnetic and solely through acoustic input and response interfaces of electronic devices.

In addition, the AWSD may leverage acoustic input and/or response systems of electronic devices other than voice-based assistants. Specifically, certain smart appliances, smart speakers, smart phones, and other computer-embedded household devices may also contain a transceiver, microphone, speaker, or some combination. For example, a washing machine may be configured as a smart washing machine that includes a microphone. The washing machine may be configured to start operation to perform one or more routine tasks in response to voice input from a user. The AWSD may operate by orchestrating a workflow of tasks, such as instructing the washing machine to begin washing clothes through a network connection. In the event that the network connection become unavailable, the AWSD may relay a command of a workflow to the washing machine through an acoustic command. Specifically, a first electronic device may audibly or inaudibly generate sound waves to imitate speech or other acoustic commands that are understood by the washing machine. Consequently, the AWSD may alleviate the technical problems in a connected environment, that occur when a network failure occurs, to successfully utilize alternative communication channels to orchestrate a workflow.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
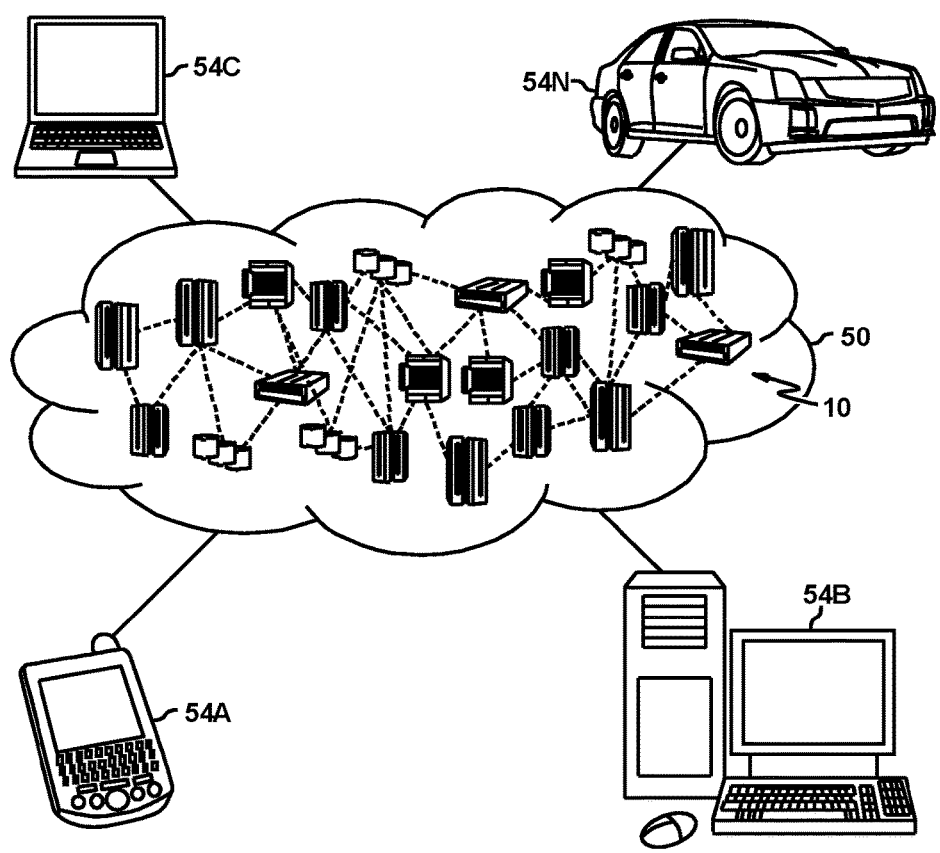
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
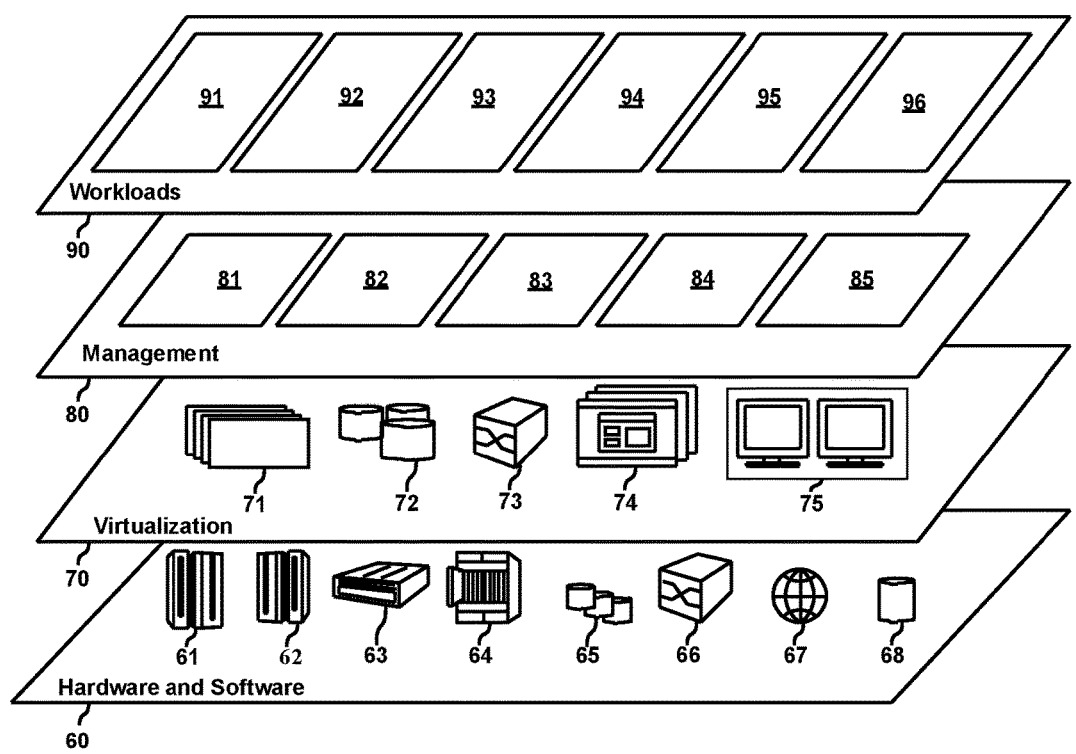
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AWSD 96.

Figure 4:
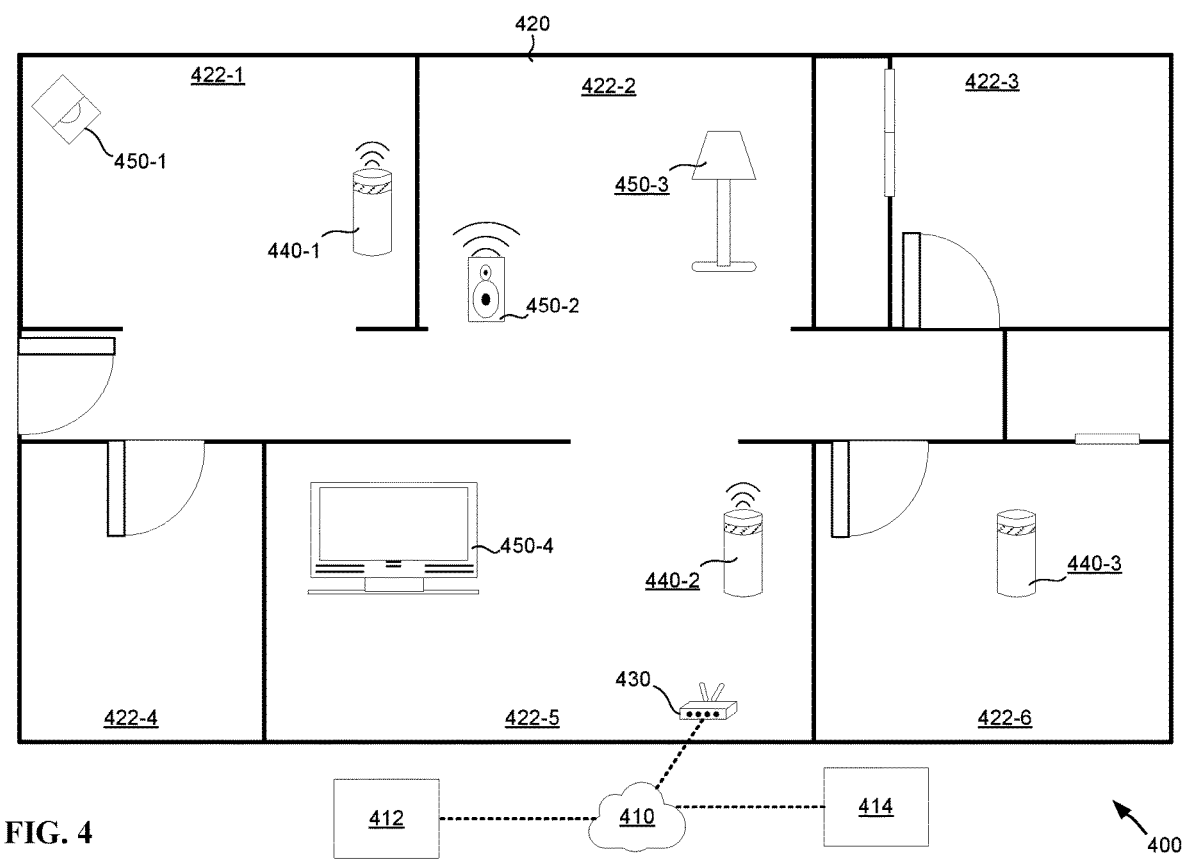
FIG. 4 depicts an example system of performing acoustic workflow distribution, consistent with some embodiments of the disclosure.

FIG. 4 depicts an example system 400 for performing acoustic workflow distribution, consistent with some embodiments of the disclosure. System 400 may include one or more of the following components: an external network 410; a connected environment 420; a local network 430; a plurality of voice-based assistants 440-1, 440-2, and 440-3 (collectively, 440), and a plurality of electronic devices 450-1, 450-2, 450-3, and 450-4 (collectively, 450).

The external network 410 may facilitate connection of system 400 to one or more external computer systems outside of the connected environment 420, such as cloud computer system 412 and manufacturer server 414. Cloud computer system 412 may be a cloud processing environment, such as cloud computing environment 50. Cloud computer system 412 may be configured to perform or offload one or more processing tasks for the voice-based assistants 440 and/or the electronic devices 450. Manufacturer server 414 may be one or more servers and connected datastores (not depicted) that store specifications regarding various electronic devices. the manufacturer server 414 may be configured to, in response from requests from the connected environment 420 or the cloud computer system 412, provide information regarding the voice-based assistants 440 and/or the electronic devices 450. The information may be used by the connected environment 420 and/or the cloud computer system 412 to determine the characteristics of the voice-based assistants 440 and/or the electronic devices 450. For example, voice-based assistant 440-2 may request various wake words, machine-based grammars, processing speeds, volume settings, or other parameters of electronic device 450-2.

Connected environment 420 may be a physical structure, such as a smart home or smart office. Connected environment 420 may comprise a plurality of rooms 422-1, 422-2, 422-3, 422-4, 422-5, and 422-6 (collectively rooms 422. As depicted in FIG. 4, connected environment 420 may be a home and the plurality of rooms 422 may be as follows: room 422-1 may be a kitchen, room 422-2 may be a combination dining room and lounge, room 422-3 may be a bedroom, room 422-4 may be a bathroom, room 422-5 may be a living room, and room 422-6 may be a home office. It is appreciated that AWSD of system 400 may be performed in various other connected locations to facilitate the communication of various devices having intermittent or changing network connectivity, such as a sports stadium, office buildings, manufacturing plants, schools, academic institutions, hospitals, and the like.

The local network 430 may be located inside the connected environment 420 and may facilitate communication of the voice-based assistants 440 and the electronic devices 450. The local network 430 may include one or more infrastructure and physical components (e.g., routers, wireless access points) designed to relay network traffic using a network protocol (e.g., TCP/IP, 802.11(b, g, n, ac, ax), Bluetooth, etc.) using packets, datagrams, or other relevant network traffic. Each of the voice-based assistants 440 may include components of a computer system (e.g., computer 100), and may contain processors, memory, network I/O, and an acoustic transceiver, microphone, and/or speaker as other I/O. The voice-based assistants 440 may also be configured to interact with users, such as performing one or more operations, actions, information lookups, and tasks responsive to requests and workflows initiated by a given user. In some embodiments, the voice-assistants 440 and/or electronic devices 450 may be configured to provide a visual message indicative of operations of AWSD in performing tasks or workflows. For example, electronic device 450-4 may be configured to show a visual message on a display. The visual message may describe the next task that is to be performed by electronic device 450-4 or by another device, such as a voice-based assistant 440 or another electronic device 450.

The voice-based assistants 440 may also be configured to provide acoustic feedback to a user. For example, voice-based assistant 440-1 may receive a request to look up the weather, and, responsively, may query through the external network 410 an Internet service provider (ISP) to retrieve current weather information. The electronic devices 450 may be household devices that included embedded processing, memory, and I/O (e.g., components of computer 100). The electronic devices 450 may be configured to send and receive information from other devices through the local network 430. For example, electronic device 450-3 may be a smart light that is responsive to network signals from other devices, such as one or more of the voice-based assistants 440 and/or other electronic devices 450. In another example, electronic device 450-1 may be a smart washing machine configured to run a laundry cycle to clean clothes. Electronic device 450-1 may start a cleaning cycle in response to a network signal received from a voice-based assistant 440-1. In some embodiments, each of the electronic devices 450 may also include a microphone (not depicted) to receive input for the embedded processor, and the embedded processors may be configured to operate based on a machine-specific grammar. For example, electronic device 450-2 may respond to a wake word or phrase, such as "hey speaker", followed by a command, such as "play my favorite song", "what's the weather?", "how did my favorite sports team do?" or other relevant phrase. In another example, electronic device 450-4 may respond without a wake word with commands such as "launch the news", "launch sports for one hour", "launch channel 35" or other relevant phrase without a wake word previously appended. In yet another example, electronic device 450-3 may respond to an acoustic command that is non-verbal, such as a clapping, snapping, or tapping noise created by a user.

The voice-based assistants 440 may be configured to store and execute various tasks or jobs. For example, a given voice-based assistant 440 may be instructed to turn on electronic device 450-4 based on detecting the presence of a user, based on a network signal from another device, and/or based on a scheduled task. The voice-based assistants 440 and the electronic devices 450 may be configured to perform a connected environment workflow. a connected environment workflow (e.g., a home automation, a smart office task flow). A connected environment workflow ("workflow") may be a series of tasks to be performed in concert, in series, in parallel, somewhat contemporaneously, and/or nearly contemporaneously.

In one example, a user may configure (e.g., through a computer, or by a voice-based interface of one of the voice-based assistants 440) a first connected environment workflow ("workflow") to have one or more voice-based assistants 440 and/or electronic devices 450 to perform multiple workflow tasks ("tasks") in a specific ordering, sequence, or series. In another example, a user may create a second workflow for electronic device 450-3 to turn off a light, electronic device 450-1 to start a clothes washing cycle, and electronic device 450-2 to lower volume and/or stop playing an audio file in response to a workflow command such as verbally saying the phrase "good night home" to any of the voice-based assistants 440. In yet another example, a user may create a third workflow that responds to the verbally stated phrase "start morning routine" to any of the voice-based assistants 440. Here, the first electronic device 450-3 will turn on a light, electronic device 450-4 will turn on a television and change the station to a news program, then after one hour, electronic device 450-4 will turn off the television, then after another twenty minutes, electronic device 450-3 will turn off a light, and electronic device 450-1 will start a laundry cleaning cycle.

System 400 may be configured to perform AWSD in response to changes in network availability. For example, system 400 may operate in an online configuration wherein components communicate with each other through local network 440, such as by transmitting wireless network packets to other paired devices. Specifically, a workflow may be initiated based on a particular condition (e.g., a voice command, a timer, a pre-created workflow) by voice-based assistant 440-3 instructing, through local network 440, to voice-based assistant 440-2, electronic device 450-2, and electronic device 450-1. In response to a network change, such as a loss of pairing between devices, or a temporary loss or downtime of local network 430, one or more operations of AWSD may be performed. For example, voice-based assistant 440-2 may attempt to communicate through local network 430. In response to a lack of a response from other voice-based assistants 440 or electronic devices 440, voice-based assistant 440-2 may issue an acoustic command to electronic device 450-2 to perform an operation of a given workflow or task.

In some embodiments, a voice-based assistant 440 or electronic device 450 may perform a relay of a workflow or tasks to other devices in the connected environment 420. For example, a network connection may be present between voice-based assistant 440-3 and 440-2, such as a direct Bluetooth connection. A workflow may be initiated from voice-based assistant 440-3 that includes a workflow task directed at electronic device 450. A network issue may exist between voice-based assistant 440-3 and electronic device 450, such as one or more network issues, a pairing issue, or a loss of connectivity to local network 430. Responsive to detecting the loss, AWSD may redirect one or more communications through acoustic signals. Specifically, one or more commands may be relayed through a direct network connection from voice-based assistant 440-3 to voice-based assistant 440-2. Next, voice-based assistant 440-2 may select (based on one or more factors and historical data) another device, in this example electronic device 450-2 for reception of a first set of acoustic signals (e.g., a first voice command). Electronic device 450-2 may be selected based on a proximity to other devices in connected environment 420, such as being in neighboring room 422-2 from room 422-5 (the location of voice-based assistant 440-2). Next, electronic device 450-2 may send a second set of acoustic signals to voice-based assistant 440-1. The second set of acoustic signals may be generated or derived by processing the first set of acoustic signals and translating them from a first machine-specific grammar, to a second machine-specific grammar. Next, voice-based assistant 440-1 may send a third set of acoustic signals to electronic device 450-1.

The determination to generate or transmit acoustic signals to one or more entities may be based on historical learning or machine learning. The acoustic signals, likewise, may be adjusted, changed, or otherwise modified depending on the environment. For example, one or more of the acoustic signals may be in a human-range of hearing, such as audible signals or voice commands. In some embodiments, the acoustic signals may be outside of a human range, such as ultrasonic or subsonic signals. For example, upon a detection or determination of the presence of other humans or music being played in one or more rooms 422, voice-based assistant 440-2 may translate the signals into ultrasonic acoustic commands. In some embodiments, the volume of playback of the acoustic signals may be adjusted depending on the connected environment 420, the location of the voice-based assistants 440, the location of the electronic devices 450, or some combination.

In some embodiments, AWSD of system 400 may execute machine learning on data (e.g., historical data) using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, a natural language processing system may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from voice commands, worfklows, machine specifications, acoustic mappings of connected environment 420, and the like. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., analysis of a voice command file provided by a manufacturer server 414). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a string within a packet of data of a worfklow at the natural language processing system, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

In some embodiments, the natural language processing system may leverage one or more of the example machine learning techniques to perform machine-learning (ML) text operations. Specifically, system 400 may operate to perform machine-learning text classification and/or a machine-learning text comparison for performing AWSD. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g, forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

The machine learning and natural language processing may be processed locally, such as by one of the voice-based assistants 440 or electronic devices 450. The machine learning and natural language processing may be performed remotely, such as by cloud computing system 412. In some embodiments, a combination of the voice-based assistants 440, the electronic device 450, and the cloud computing system 412 may be configured to perform machine learning and natural language processing to perform AWSD in system 400, consistent with some embodiments. For example, communication may be performed in between each voice-based assistant 440 and/or electronic device 450 to determine the make, model, manufacturer, series number, model number, or other relevant specifications of a particular voice-based assistant 440 and/or electronic device 450. An information request may be sent to a manufacturer server 414 by way of external network 410.

In another example, voice-based assistant 440-3 may communicate through network 430 with electronic device 450-2 and voice-based assistant 440-2. During communication through network 430, voice-based assistant 440-3 may query for a list of first accepted voice commands of electronic device 450-2 and a list of second accepted voice commands of electronic device 440-2. Upon receiving one or more acceptable voice commands from the voice-based assistant 440-2 and electronic device 450-2, voice-based assistant 440-3 may perform some machine learning operations and natural language processing operations locally and may offload some natural language processing operations and machine learning operations to cloud computing system 412. The processing of the machine learning operations and the natural language processing may result in a first device specific grammar for voice-based commands acceptable to electronic device 450-2 and a second device specific grammar for voice-based commands acceptable to voice-based assistant 440-2.

The one or more voice-based assistants 440, electronic devices 450, and or cloud computing system 412 may operate to process historical data to determine a machine-specific grammar of one or more of the voice-based assistants 440, and the electronic devices 450 based on voice samples or other acoustic data. For example, the voice-based assistants 440, electronic devices 450, and or cloud computing system 412 may operate to determine the machine-specific grammar based on voice samples and/or information received from manufacturer server 414. In another example, processing performed by voice-based assistant 440-2 and cloud computing system 412 may perform machine learning or natural language processing on recorded previous voice-commands issued by a user to electronic device 450-3 to determine that electronic device 450-3 operates based on clapping or other non-verbal acoustic signals. In yet another example, voice-based assistant 440-3 and electronic device 450-2 may operate to determine a device specific grammar of electronic device 450-1 includes a wake word, such as "Okay Laundry", preceding a command by processing a previously recorded set of audio samples through machine learning. The previously recorded set of audio samples may be examples of acoustic commands provided from manufacturer server 414 or historical interaction.

The one or more voice-based assistants 440, electronic devices 450, and or cloud computing system 412 may operate to process historical data to determine the operation of one or more workflows and to identify workflow tasks of a given workflow. For example, an electronic device 450-4 and voice-based assistant 440-2 may communicate between each other over network 430 to determine a particular workflow, including the order of specific tasks and the timing. Further, voice-based assistant 440-2 may perform machine learning or natural language processing to determine a schedule, series, order, dependency or other relationship between various tasks in order to generate acoustic commands of AWSD with electronic device 450-1 by a user (not depicted) in connected environment 420.

In another example scenario the AWSD may operate consistent with the following operations. In the connected environment 420, each electronic device 450 and voice-based assistant 440 may be configured to perform a workflow, e.g., a home automation, a series of tasks, an interrelated process. Historical learning processes may be executed by each electronic device 450 and voice-based assistant 440 to generate a knowledge corpus that describes the various devices and their capabilities in the connected environment 420. The knowledge corpus ("KC") may be used as a basis of AWSD. Specifically, the KC may be used to identify one or more sequences of activities of the electronic device 450 and voice-based assistants 440 in performing one or more tasks of a workflow. The KC may be used to execute the workflows in future occurrences. The entries of the KC may include various activities, and, as the electronic device 450 and voice-based assistants 440 are monitored, the KC may be augmented by tagging the entries with the particular signals, commands, and grammar-specific acoustic commands for each of the electronic device 450 and voice-based assistants 440. Further, any schedules, sequences, dependencies, and relationships may be added or tagged to the entries of the KC (e.g., start times, predetermine sequences, dependent tasks, parallel execution). The entries of the KC may be updated by the system 400, by generating unique identifiers (e.g., identities, names, identification numbers, workflow sources, workflow targets). The KC may be generated in conjunction with the processing power of one or more of the electronic devices 450, the voice-based assistants 440, and the cloud computer system 412. During times of local network availability 430, the KC may be transmitted to each of the electronic device 450 and voice-based assistants 440. The KC may be stored in a memory of each of the electronic device 450 and voice-based assistants 440. Later, when an AWSD may be leveraged (e.g., a downtime or unavailability of a network connection between various devices or a more general downtime or unavailability of local network 430), the KC may be consulted to generate the acoustic commands for communication between one or more of the electronic devices 450 and voice-based assistants 440.

In some embodiments, one or more of the electronic devices 450 and voice-based assistants 440 may proactively test or validate acoustic communication. For example, during a time of network connectivity, one or more of the electronic devices 450 and voice-based assistants 440 may transmit, through local network 430, a test request. The test request may include a request for the type of acceptable acoustic commands that a particular electronic device 450 or voice-based assistant 440 may accept. The test request may include a request for any potential false positives that a particular electronic device 450 and voice-based assistants 440 may identify. For example, voice-based assistant 440-2 may attempt to initiate a test with electronic device 450-4 by sending out a broadcast that a test is to begin to all the other electronic devices 450 and voice-based assistants 440 as well as electronic device 450-2. After receiving a confirmation that the electronic devices 450 and voice-based assistants 440 are listening, voice-based assistant 440-2 may send out test acoustic commands (e.g., voice commands) that are directed towards electronic device 450-4. If the test acoustic commands trigger any other electronic device 450 or voice-based assistant 440, then that other electronic device 450 or voice-based assistant 440 may communicate a false alarm or false positive to voice-based assistant 440-2 and/or electronic device 450-4. In response to a false alarm or false positive, the electronic devices 450 and/or voice-based assistants 440 may collaboratively alter the acoustic commands (e.g., adjusting volume of playback, adjusting timing, adjusting wake words).

In some embodiments, the electronics device 450 and/or voice-based assistants 440 may insert delays into various acoustic commands based on a particular workflow. For example, if a given workflow is directed at multiple electronic devices 450 and/or voice-based assistants 440, an estimated time for a completion of a first task may be determined. The estimated time for completion may be added to the workflow such that upon issuing a first acoustic command, the estimated time may be used as a delay for a second acoustic command. In another example, if a given workflow requires multiple electronic devices 450 or voice-based assistants 440 tasks to be performed, then an acoustic command offset, or a start time command offset may be generated. An acoustic command offset may be a time or period of time that a particular electronic device 450 or voice-based assistant 440 may pause before issuing an acoustic command. The acoustic command offset may provide silence or absence of emanating or creating a particular acoustic command from a first electronic device 450 or voice-based assistant 440, such that a second electronic device 450 or voice-based assistant 440 may issue another acoustic command. A start time command offset may be a command that indicates that a particular electronic device 450 or voice-based assistant 440 should delay before performing a particular task. The delay may be time or time-period used to permit another electronic device 450 and/or voice-based assistant 440 to issue another acoustic command to another device.

Figure 5:
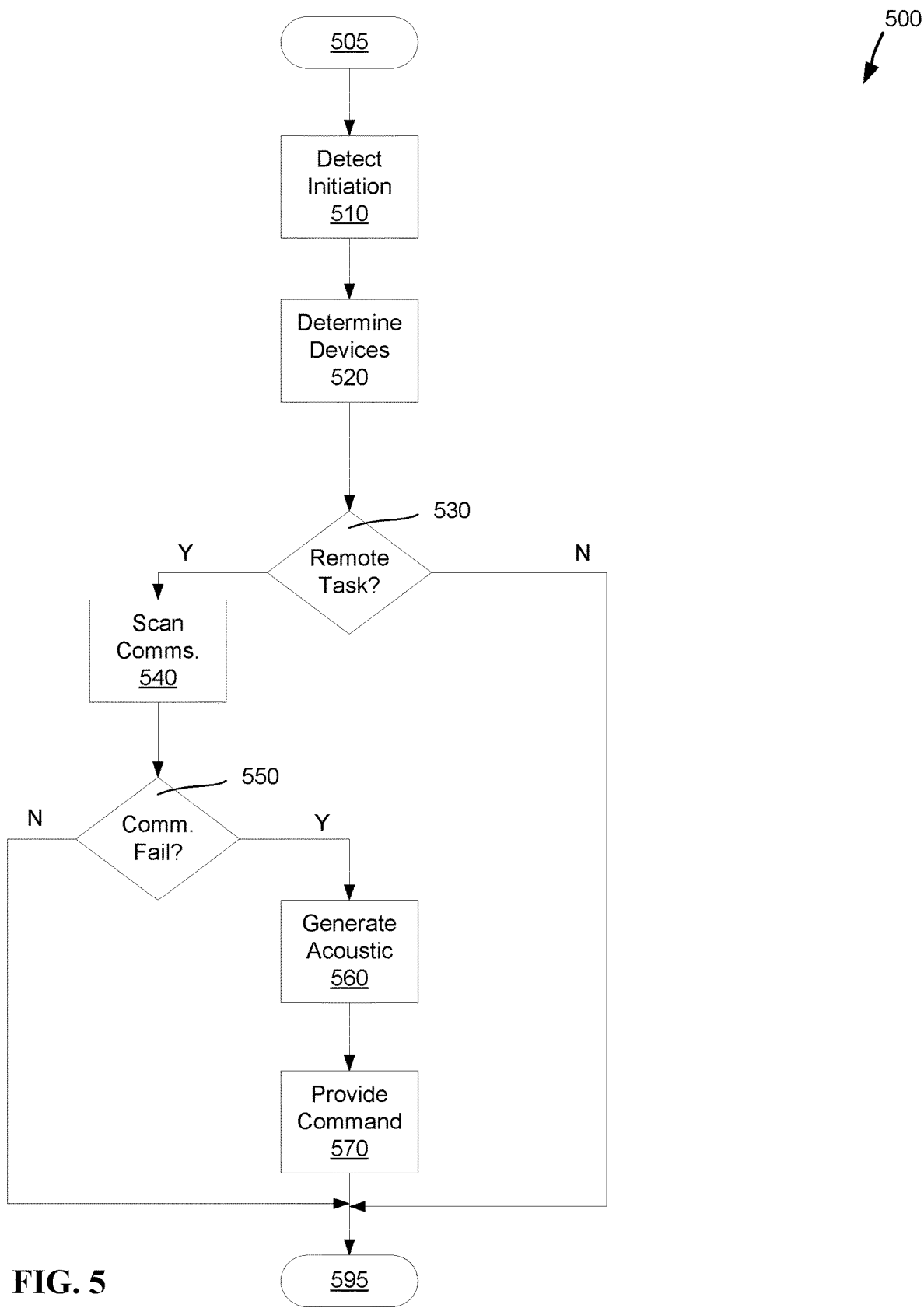
FIG. 5 depicts an example method of acoustic command distribution, consistent with some embodiments of the disclosure.

FIG. 5 depicts an example method 500 of acoustic command distribution, consistent with some embodiments of the disclosure. Method 500 may be performed by a computer system, such as computer 100. Method 500 may be performed by a cloud computer, such as cloud computing environment 50. Method 500 may be performed by an electronic device or voice-based assistant, such as described in system 400. Method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

From start 505, a workflow initiation may be detected at 510. A workflow initiation may be a task of a particular connected environment workflow, such as a command that is to be performed in a smart home. A workflow initiation may be a plurality of workflow tasks, such as a series of operations to be performed in a smart office. The task or tasks to be performed may be to adjust one or more smart devices or voice-based assistants, such as to adjust the volume of a smart speaker. The detection may be performed by a first device (e.g., voice-based assistant 440-2, electronic device 450-3). The detection may be based on scanning a set of pre-set or scheduled tasks or workflows. The detection may be based on receiving an instruction from a user, such as through a graphical user interface of a personal computer, a voice-based command from a smartphone, or from another relevant interface (e.g., a command issued remotely from a web-based interface and transmitted through an external network connection).

At 520, a set of devices that are to perform a task are determined. The set of devices may be internal. For example, only a single device that detects the initiation may be the target of the task that is related to the initiation. The set of devices may be solely external, e.g., a task that is detected at a first device that is directed to only another device. Determining the set of devices may include determining multiple devices are part of the initiation. For example, a particular workflow may be detected upon analysis of the initiation. The workflow may be directed to multiple devices that may or may not include the device that detected the workflow initiation.

If it is determined that a task is a remote task at 530:Y, then method 500 may continue by scanning for the presence of a communication failure between various devices at 540. A remote task may be a task or a workflow that includes one or more tasks directed to a second device or a device that did not detect the initiation of tasks at 510. Scanning for communication failure at 540, may include sending network traffic along a network that communicatively couples one or more devices. For example, a first device may send a ping command through a local area network directed to a second device that is the target of the task or tasks. Scanning for a communication failure may include listening to particular network traffic, such as monitoring for network activity from a particular second device that is the target of the task(s).

If a communication failure is detected at 550, an acoustic command may be generated at 560. The acoustic command may be generated by performing internally by a device in a connected environment (e.g., processing performed by a voice-based assistant 440, processing performed by an electronic device 450). The acoustic command may be generated by formatting a command into a device-specific grammar (e.g., appending wake commands, adjusting the pacing, modifying the speed, adjusting the playback volume). The acoustic command may be generated with an offset or delay to allow for other acoustic communication to occur. The acoustic command may be generated with an offset or delay to allow for the completion of another task or tasks to be performed. The acoustic command may be generated by embedding a forward or relay command into the acoustic command. For example, if a command is directed to a second device, and the second device is separated from a first device that generates the command by a considerable distance, the acoustic command may be appended with a second acoustic command that is directed to a third device that is in between the first and second devices.

After the acoustic command is generated, the acoustic command may be provided to the second device that is the target of the task(s) at 570. For example, the device that received the workflow initiation may play through a transducer the acoustic command at a particular volume and speed such that a second device or assistant in connected environment 420 may be able to receive it by a microphone communicatively coupled to the second device. After the acoustic command is provided at 570, or if there is not a communication failure at 550:N, or if the task is not a remote task at 530:N, method 500 ends at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a first electronic device, a workflow initiation,
   wherein:
      the workflow initiation is directed to a connected environment workflow, and
      the connected environment workflow related to performance of a set of one or more workflow tasks;
   determining, in response to the workflow initiation, a first remote task of the set of workflow tasks is directed at a second electronic device;
   identifying, based on the first remote task, a communication failure with the second electronic device;
   generating, in response to the communication failure, an acoustic command, the acoustic command related to the first remote task; and
   providing the acoustic command to the second electronic device.

2. The method of claim 1, further comprising:
   retrieving, in response to the communication failure, one or more device specifications related to the second electronic device, and
   wherein the acoustic command is generated based on the one or more device specifications.

3. The method of claim 1, wherein the acoustic command is an ultrasonic command.

4. The method of claim 1, wherein the providing the acoustic command comprises:
   identifying a third electronic device that is communicatively coupled to the first electronic device through a network connection;
   determining the third electronic device is separated from the second electronic device by a first distance; and
   determining the first electronic device is separated from the second electronic device by a second distance.

5. The method of claim 4, further comprising:
   transmitting, through the network connection and based on the second distance being greater than the first distance, the acoustic command to the third electronic device; and
   causing the acoustic command to be played by the third electronic device.

6. The method of claim 4, further comprising:
   determining the second distance being less than the first distance; and
   causing the acoustic command to be played by the first electronic device.

7. The method of claim 1, wherein the providing the acoustic command comprises:
   determining a distance between the first electronic device and the second electronic device; and
   adjusting, in response to the distance, a volume parameter of an output device communicatively coupled to the first electronic device; and
   causing, after the adjustment of the volume parameter, the acoustic command to be played by the first electronic device.

8. The method of claim 1, wherein the first electronic device and the second electronic device were previously paired together through a network connection, and wherein the communication failure is the first electronic device unable to communicate through the network with the second electronic device, the method further comprising:
   determining, through the network and before the communication failure, a second device wake command of the second electronic device.

9. The method of claim 8, wherein the generating the acoustic command comprises:
   appending the second device wake command to a portion of the acoustic command related to the first remote task.

10. The method of claim 1, wherein the generating the acoustic command comprises:
    identifying a second workflow task of the set of workflow tasks of the connected environment workflow, the second workflow task to occur before the first workflow task; and
    generating, based on the second workflow task and the first workflow task, a first delay amount of the first workflow task, the first delay amount based on the length of time to complete the second workflow task.

11. A system, the system comprising:
    a memory, the memory containing one or more instructions; and
    a processor, the processor communicatively coupled to the memory, the processor, in response to reading the one or more instructions, configured to:
       detect, by a first electronic device, a workflow initiation,
       wherein:
          the workflow initiation is directed to a connected environment workflow, and
          the connected environment workflow related to performance of a set of one or more workflow tasks;
       determine, in response to the workflow initiation, a first remote task of the set of workflow tasks is directed at a second electronic device;
       identify, based on the first remote task, a communication failure to communicate with the second electronic device;
       generate, in response to the communication failure, an acoustic command, the acoustic command related to the first remote task; and
       provide the acoustic command to the second electronic device.

12. The system of claim 11, wherein the acoustic command is an ultrasonic command.

13. The system of claim 11, wherein the processor is further configured to:
    retrieve, in response to the communication failure, one or more device specifications related to the second electronic device, and
    wherein the acoustic command is generated based on the one or more device specifications.

14. The system of claim 11, wherein the provide the acoustic command comprises:
    identify a third electronic device that is communicatively coupled to the first electronic device through a network connection;
    determine the third electronic device is separated from the second electronic device by a first distance; and
    determine the first electronic device is separated from the second electronic device by a second distance.

15. The system of claim 14, wherein the processor is further configured to:

transmit, through the network connection and based on the second distance being greater than the first distance, the acoustic command to the third electronic device; and cause the acoustic command to be played by the third electronic device.

16. A computer program product, the computer program product comprising:

one or more computer readable storage media; and program instructions collectively stored on the one or more computer readable storage media, the program instructions configured to:

detect, by a first electronic device, a workflow initiation, wherein:

the workflow initiation is directed to a connected environment workflow, and the connected environment workflow related to performance of a set of one or more workflow tasks;

determine, in response to the workflow initiation, a first remote task of the set of workflow tasks is directed at a second electronic device;

identify, based on the first remote task, a communication failure to communicate with the second electronic device;

generate, in response to the communication failure, an acoustic command, the acoustic command related to the first remote task; and provide the acoustic command to the second electronic device.

17. The computer program product of claim 16, wherein the acoustic command is an ultrasonic command.

18. The computer program product of claim 16, wherein the provide the acoustic command comprises:

determine a distance between the first electronic device and the second electronic device; and adjust, in response to the distance, a volume parameter of an output device communicatively coupled to the first electronic device; and cause, based on the adjusted volume parameter, the acoustic command to be played by the first electronic device.

19. The computer program product of claim 16, wherein the first electronic device and the second electronic device were previously paired together through a network connection, and wherein the communication failure is the first electronic device unable to communicate through the network with the second electronic device, the program instruction further configured to:

determine, through the network and before the communication failure, a second device wake command of the second electronic device.

20. The computer program product of claim 19, wherein the generating the acoustic command comprises:

append the second device wake command to a portion of the acoustic command related to the first remote task.

* * * * *